United States Patent [19]

Epino

[11] Patent Number: 4,540,387
[45] Date of Patent: Sep. 10, 1985

[54] APPARATUS FOR ADJUSTING THE SPACING BETWEEN SHEAVES

[76] Inventor: Jose G. Epino, 3316 Park St., Jacksonville, Fla. 32205

[21] Appl. No.: 584,783

[22] Filed: Feb. 29, 1984

[51] Int. Cl.³ .............................................. F16H 7/08
[52] U.S. Cl. .................................... 474/136; 254/100
[58] Field of Search ...................... 474/136, 137, 113; 254/100; 24/513, 517, 457

[56] References Cited

U.S. PATENT DOCUMENTS

| | | | |
|---|---|---|---|
| 3,118,315 | 1/1964 | Loosli | 474/136 X |
| 3,325,095 | 6/1967 | Mueller et al. | 254/100 |
| 3,679,176 | 7/1972 | Campbell | 254/100 |
| 3,727,884 | 4/1973 | Custer | 254/100 |
| 3,869,934 | 3/1975 | Pierce | 254/100 |
| 3,880,394 | 4/1975 | Wisecarver | 254/100 |
| 3,920,219 | 11/1975 | Hendrix, Jr. | 254/100 |
| 3,960,359 | 6/1976 | Svahn et al. | 254/100 |
| 3,997,957 | 12/1976 | Tone et al. | 254/100 |

Primary Examiner—James A. Leppink
Assistant Examiner—Thuy M. Bui
Attorney, Agent, or Firm—Arthur G. Yeager

[57] ABSTRACT

This invention relates to an apparatus for adjusting the spacing between sheaves and tightening the belts operating the sheaves, the apparatus comprising an elongated threaded rod and an elongated smooth guide rod spaced apart therefrom and parallel thereto, two spaced lateral support arms attached to both rods, one arm being fixed and the other being movable by threaded engagement to the threaded rod, each arm supporting a positionally adjustable concave receptacle, the two receptacles being aligned with each other parallel to the rods and the concave portions facing away from each other, the threaded rod having one end journaled in the fixed arm and the other end fashioned with a head to which a wrench may be fitted for turning the threaded rod.

12 Claims, 6 Drawing Figures

APPARATUS FOR ADJUSTING THE SPACING BETWEEN SHEAVES

BACKGROUND OF THE INVENTION

It is well known that many power trains employ belts and pulleys for transferring power from one shaft to another, and that in the course of employing such systems it may become necessary to adjust the tension of the belt. The most frequent occurrence is that due to stretching of the belt or movement of the pulleys the belt becomes too loose to function properly and must be put under greater tension in order to provide enough friction not to slip on the pulley.

A modern type of belt-and-pulley combination is the V-belt and the corresponding sheave. These are widely used on automobiles to provide power transfer from the crankshaft of the engine to auxiliary equipment such as the waterpump, the generator, the aid conditioning compressor, etc. The auxiliary equipment is normally mounted on a pivotable frame to permit adjustment of the distance between sheaves to provide the proper belt tension. The usual difficulty is that of forcing the sheaves and V-belt far enough apart to obtain the proper belt tension and to hold the sheaves in the position long enough to clamp the auxiliary equipment holding the sheave in that position. It is an object of this invention to provide an apparatus for accomplishing this task with facility.

There have been known in the prior art devices for accomplishing this purpose. For example, U.S. Pat. Nos., U.S. Pat. No. 3,325,095
U.S. Pat. No. 3,679,176
U.S. Pat. No. 3,727,884
U.S. Pat. No. 3,869,934
U.S. Pat. No. 3,920,219
U.S. Pat. No. 4,036,029 all describe apparatus to tighten belts on pulleys. Some of these function by being mounted between cooperating sheaves and pushing them apart by the force exerted by advancing a screw thread. Many of these latter types have sharp blade-like members at each end to engage the V-groove in the sheaves. The adjustment of the screw thread is usually accomplished by turning a nut in the middle of the device somewhat like a turnbuckle. This is not convenient for automobile engines where little space is provided for hands to repair the engine. Furthermore, there may be a much more convenient point of attachment to spread the sheaves apart than the bottom of the V-groove.

It is an object of this invention to provide an improved apparatus for tightening belt drives. It is another object to provide such an apparatus that may be adjusted to provide many operating positions for more convenience. Other objects will appear in the more detailed description which follows:

BRIEF DESCRIPTION OF THE INVENTION

This invention relates to an apparatus for applying force to increase the spacing between two cooperating sheaves comprising an elongated threaded rod having an upper journal section and a lower journal section with a wrench receiving head extending beyond said upper journal section, a stationary transverse support arm having a recess to receive said lower journal section, a travelling transverse support arm having a threaded hole mated with said elongated threaded rod, a non-threaded guide rod spaced from and positioned parallel to said elongated threaded rod and being affixed to said stationary arm and slidingly engaged in a hole in said travelling arm, a connecting spacer clamped to the end of said nonthreaded rod adjacent the head of said threaded rod and a hole for receiving said upper journal section, each of said arms having adjustably affixed thereto a receptacle adapted to receive a portion of a sheave, the two receptacles being aligned with each other parallel to said threaded arm and directed away from each other.

In preferred embodiments of this invention the guide rod and the threaded rod are connected by a spacer fixed to the guide rod and functioning as an upper bearing for the threaded rod which is journaled at its other end in the fixed arm.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 4:
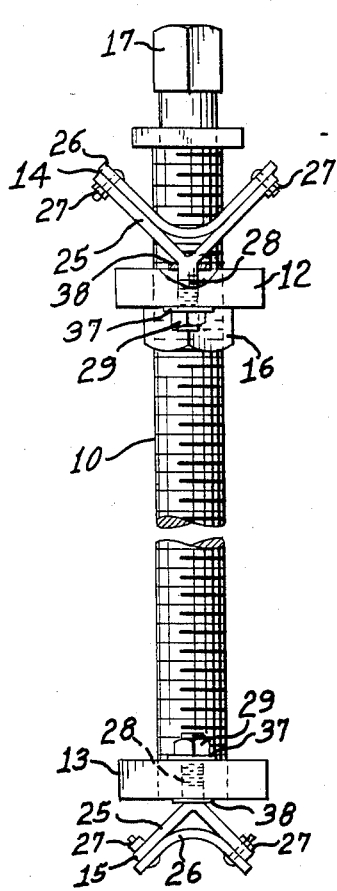
FIG. 4 is a front elevational view of the apparatus of this invention.
Figure 5:
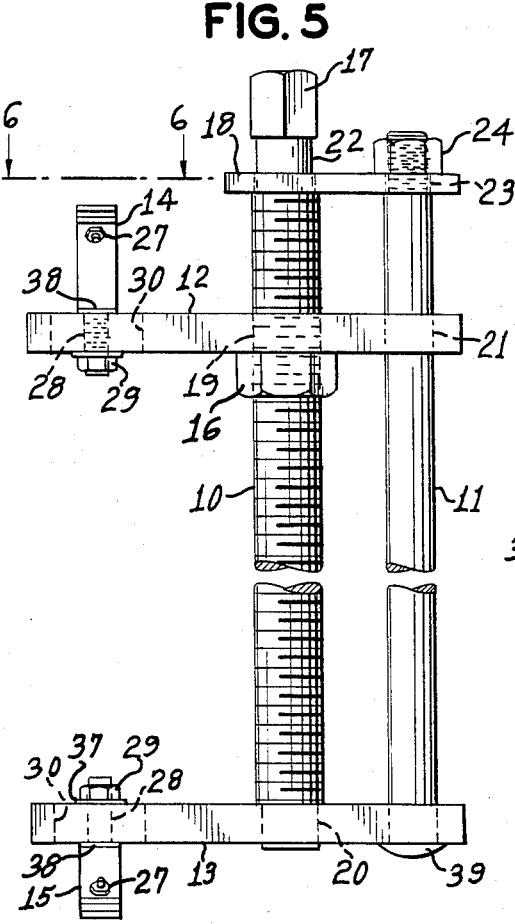
FIG. 5 is a side elevational view of the apparatus of this invention.
Figure 6:
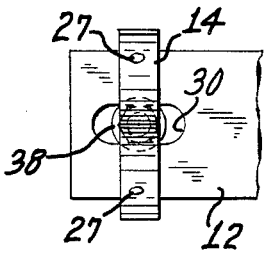
FIG. 6 is a partial top plan view of the portion 6—6 shown in FIG. 5.

The apparatus of this invention is shown in detail in FIGS. 4–6. An elongated threaded rod 10 cooperates with two support arms 12 and 13 which can be moved apart from each other or moved closer to each other by turning rod 10. Arm 12 is a travelling arm which moves up and down rod 10 because of tapped hole 19 which engages the threads on rod 10. Arm 13 is a stationary arm into which rod 10 is journaled in smooth hole 20 which may or may not contain a bearing.

It is desirable that arms 12 and 13 be substantially parallel at all times, and smooth guide rod 11 performs this function. Rod 11 passes through hole 21 in travelling arm 12, with arm 12 being slidable up and down rod 11 over substantially the entire length of the threaded portion of rod 10. Rod 11 is fixed in position parallel to rod 10 and spaced apart from rod 10. In the embodiment shown here, rod 11 is fixed in this position by round head 39 at one end and by threaded neck 23 and nut 24 at the other end. In order to secure the upper end of rod 11 spacer bar 18 fits loosely over neck 22 of rod 10 and neck 23 of rod 11. This arrangement permits rod 10 to be turned, preferably by applying a suitable wrench to head 17, and cause travelling arm 12 to move up or down rod 10.

Each of arms 12 and 13 is fitted with a receptacle 14 or 15, respectively which is capable of receiving any convenient portion of a sheave for purposes of pushing the two sheaves farther apart. The convex side of receptacles 14 and 15 are positioned to face away from each other so that rounded portions of sheaves or their shafts can be seated in the receptacle and forced farther apart. A preferred design for receptacles 14 and 15 is a V-strip support 25 with a cushion strip 26 fastened to it on its concave side by a nut and bolt 27 or any other convenient fastening means. Support 25 may be steel and strip 26 may be aluminum, rubber, plastic, or the like. Strip 26 should be a softer material than that of the sheave it is to receive so that any scraping or other damage in the process of adjusting sheaves will occur to strip 26 rather than to the sheave. On the convex side of V-strip 25 is attached threaded shank 28 which cooperates with nut 29 to fasten receptacle 14 or 15 to arm 12 or 13, respectively. In order to provide adjustment flexibility it is preferred that a slot 30 be machined into arms 12 and 13 permitting receptacles 14 and 15 to be moved a short distance lengthwise of the arm. Thus receptacles 14 and 15 can be rotated 360° and can be moved enough with respect to arms 12 and 13 to permit the apparatus of this invention to be applied in almost every conceivable arrangement of sheaves that might have to be adjusted to tightening of the belt. It may be necessary, depending on the sizes of slot 30, shank 28 and V-strip 25 to employ one or both of washers 37 and 38 so that nut 29 can be tightened to hold receptacle 14 or 15 in any desired orientation and position.

Figure 1:
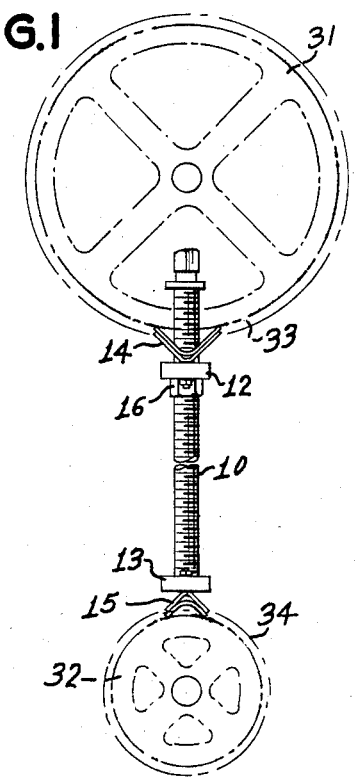
FIG. 1 is a front elevational view of the apparatus of this invention applied to two sheaves in one mode of employment.
Figure 2:
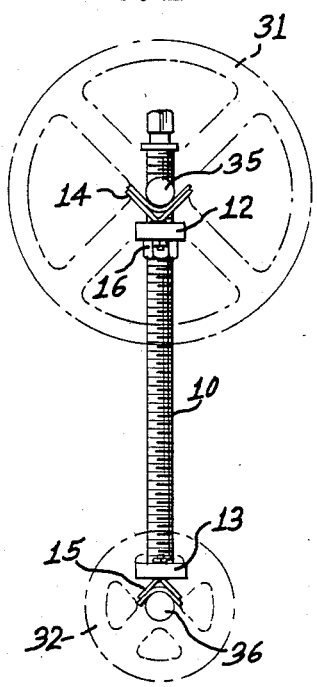
FIG. 2 is a front elevational view of the apparatus of this invention applied to two sheaves in a second mode of employment.
Figure 3:
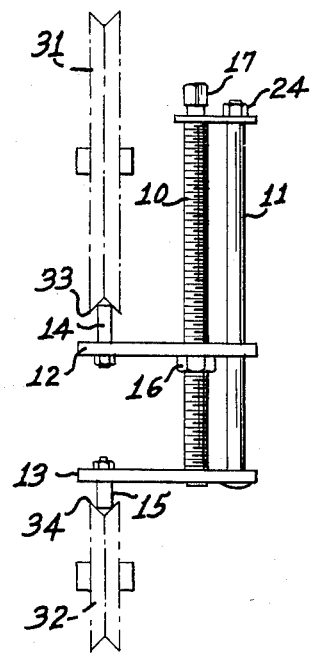
FIG. 3 is a side elevational view of the apparatus of FIG. 1.

In FIGS. 1–3 there are shown two embodiments of employing this invention to adjust the spacing between two sheaves 31 and 32. In FIGS. 1 and 3 receptacles 14 and 15 are applied to the rims 33 and 34 of the two sheaves with receptacles 14 and 15 being generally parallel to the plane of the sheaves 31 and 32. It is possible to rotate receptacles 14 and 15 90° from their positions in FIGS. 1 and 3 so that the plane of sheaves 31 and 32 is at right angles to the plane of receptacles 14 and 15, however, such an arrangement is not as stable as that shown in FIGS. 1 and 3. In FIG. 2 receptacles 14 and 15 are applied to shafts 35 and 36 rather than to sheaves 31 and 32 which are mounted on those shafts. It may be equally convenient to apply receptacles 14 and 15 to the hubs of sheaves 31 and 32 rather than to shafts 35 and 36. It will be appreciated that there will be other locations for applying receptacles 14 and 15 that are suitable for adjusting the spacing between sheaves 31 and 32.

In the operation of the apparatus of this invention, head 17 is rotated to bring arms 12 and 13 closer together so that receptacles 14 and 15 can be positioned to receive the selected respective portions of the two sheaves to be adjusted. Receptacle 15 is first positioned against the selected portion of the sheave to which is is to be attached. Receptacle 14 is then positioned near the portion of the other sheave to which it is to be attached. A wrench is applied to head 17 and rod 10 is turned until receptacle 14 is tightly attached to its respective sheave. Head 17 is then turned farther until the desired spacing between sheaves is reached. It may be convenient to secure the adjusted position by tightening lock nut 16 against arm 12 to prevent any unintentional loosening. Then the two sheaves are locked in that adjusted position. Lock nut 16 is then loosened and head 17 is turned in the reverse direction until the apparatus can be removed from the two sheaves.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An apparatus for applying force to increase the spacing between two cooperating sheaves comprising an elongated threaded rod having an upper journal section and a lower journal section with a wrench receiving head extending beyond said upper journal section, a stationary transverse support arm having a recess to receive said lower journal section, a travelling transverse support arm having a threaded hole mated with said elongated threaded rod, a nonthreaded guide rod spaced from and positioned parallel to said elongated threaded rod and being affixed to said stationary arm and slidingly engaged in a hole in said travelling arm, a connecting spacer clamped to the end of said nonthreaded rod adjacent the head of said threaded rod and a hole for receiving said upper journal section, each of said arms having adjustably affixed thereto a receptacle adapted to receive a portion of a sheave, the two receptacles being aligned with each other parallel to said threaded arm and directed away from each other.

2. The apparatus of claim 1 wherein said receptacle is a V-shaped strap.

3. The apparatus of claim 1 wherein said receptacle is rotatable through 360° and clampable in any rotational orientation.

4. The apparatus of claim 1 wherein said receptacle is adjustable longitudinally of said arm.

5. The apparatus of claim 1 wherein said threaded rod comprises an elongated central continuous threaded portion, a short nonthreaded journal portion at each end of said threaded portion and being of lesser outside diameter than the threaded portion, and a head extending beyond one said journal portion and being fashioned to receive a wrench for rotating said threaded rod about its longitudinal axis.

6. The apparatus of claim 1 wherein each said receptacle comprises a V-shaped strip with a threaded shank extending outwardly from the apex of the V, with a cooperating nut on said shank, said shank slidably adjustable in a slot in said arm and clampable in any position in said slot by tightening of said nut against said arm.

7. The apparatus of claim 1 additionally comprising a lock nut on said threaded rod cooperating with said travelling arm.

8. An apparatus for tightening a belt operating on two cooperating sheaves comprising an elongated threaded rod, an elongated smooth guide rod spaced apart from and parallel to said threaded rod, two spaced support arms substantially perpendicular to said rods and extending outwardly from said threaded rod diametrically opposite to said guide rod, a positionally adjustable concave receptacle adjacent the outer end of each arm aligned with each other in a direction parallel to said threaded rod and oriented with the concave portion of each receptacle facing away from each other, one of said support arms being fixed at the same ends of each respective rods with said threaded rod being rotatably supported therein, and the other of said support arms being movable by threaded engagement with said threaded rod and slidable engagement with said guide rod, said threaded rod having a head adapted to be gripped by a wrench for turning said threaded rod.

9. The apparatus of claim 8 which additionally comprises a lock nut on said threaded rod cooperating with said movable arm.

10. The apparatus of claim 8 wherein each said receptacle is a V-shaped strip with the concave side of the V facing away from said arm and the convex side of the V having a threaded shank affixed thereto and extending through a slot in said arm with a nut on said shank to clamp said strip in any selected orientation and position permitted by the slot.

11. The apparatus of claim 8 wherein said guide rod and said threaded rod are connected to each other by a spacer at the opposite end of said threaded rod from said fixed support arm, said spacer rotatably supporting said threaded rod inwardly of said head and fixedly attached to said guide rod.

12. The apparatus of claim 11 wherein said threaded rod is journaled at its lower end in said fixed arm and is journaled adjacent its upper end between the head and the upper end of the threaded portion of said rod in said spacer.

* * * * *